(12) United States Patent  (10) Patent No.: US 8,147,934 B2
Berbert  (45) Date of Patent: Apr. 3, 2012

(54) EASY-OPEN PACKAGES FORMED FROM PEELABLE THERMOPLASTIC LAMINATES

(75) Inventor: Otacilio Teixeira Berbert, Oshkosh, WI (US)

(73) Assignee: Curwood, Inc., Oshkosh, WI (US)

( * ) Notice: Subject to any disclaimer, the term of this patent is extended or adjusted under 35 U.S.C. 154(b) by 403 days.

(21) Appl. No.: 12/614,963

(22) Filed: Nov. 9, 2009

(65) Prior Publication Data

US 2010/0183830 A1    Jul. 22, 2010

Related U.S. Application Data

(63) Continuation-in-part of application No. 12/356,142, filed on Jan. 20, 2009.

(51) Int. Cl.
    *A22C 13/00* (2006.01)

(52) U.S. Cl. ......... 428/34.8; 428/35.2; 428/35.7; 428/35.9; 426/105; 426/129; 138/118.1; 138/137

(58) Field of Classification Search .......... 428/35.2, 428/35.7, 35.9, 34.8; 426/105, 106, 129; 138/118.137

See application file for complete search history.

(56) References Cited

U.S. PATENT DOCUMENTS

| 2,096,221 | A * | 10/1937 | Atkinson | 426/105 |
| 7,045,183 | B2 * | 5/2006 | Amano et al. | 428/35.2 |
| 2006/0269707 | A1 * | 11/2006 | Berbert | 428/35.7 |
| 2009/0029080 | A1 * | 1/2009 | Visioli et al. | 428/34.8 |

* cited by examiner

*Primary Examiner* — N. Edwards
(74) *Attorney, Agent, or Firm* — Tom J. Hall

(57) ABSTRACT

An easy-open package formed from a peelable thermoplastic laminate and adapted to peel open, whereby the manually tearing the package causes a removable strip to form thereby exposing a product enclosed therein.

49 Claims, 8 Drawing Sheets

EASY-OPEN PACKAGES FORMED FROM PEELABLE THERMOPLASTIC LAMINATES

RELATED APPLICATION

This application is a continuation-in-part of U.S. patent application Ser. No. 12/356,142, filed Jan. 20, 2009, which is incorporated herein by reference in its entirety.

FIELD OF THE INVENTION

The present invention relates generally to easy-open packages and peelable packaging laminates, and more particularly to easy-open chub packages and peelable packaging laminates suitable for use in chub packaging applications.

BACKGROUND OF THE INVENTION

Certain foods, and particularly meat products such as ground beef and other comminuted food substances, are commonly packaged in what are called chub packages. These packages are generally produced at central processing plants operated by supermarket chains or meat packing companies. It is known in the art that chub packages are generally produced using a vertical form fill seal (VFFS) process and equipment, in which a tube is formed from a flat web of roll stock. The tube is formed vertically and longitudinally sealed which may include the use of a vertical sealing bar. The longitudinal seal or seam is formed by heat-sealing the overlapping edges of the packaging film as it passes through a sealing device of the VFFS equipment. The longitudinal seal is aligned in the machine direction of the roll stock. The heat-sealing process may be accomplished using supersonic sealing, high frequency sealing and a hot-air knife sealing system. Sealing thermoplastic materials by means of a hot-air knife sealing system typically includes supplying a compressed jet of hot air at temperatures of between 120 and 700° C. and at pressures of between 0.4 and 0.8 bar directed towards the zone where the seal is to be formed between the edges of thermoplastic material. The vertical sealing bar then engages the packaging film for a predetermined dwell time to weld the overlapping edges of the packaging film and form a heat seal. A packaging film must have sufficient heat resistance to withstand relatively high temperatures and pressures during sealing process, yet can fuse together to produce a reliable, hermetic heat seal.

With the longitudinally seal formed, the bottom of the tube may then be sealed with a metal clip applied to the bottom of the tube (known as crimping) and a comminuted product pumped into the open end of the tube. The top of the filled tube is then sealed with another metal clip to produce the final chub package. In appearance, these chub packages resemble semi-rigid tubes with the tubular web forming a skin tight layer around the food product. Package sizes may range from 1 to 20 pounds, depending on the intended mode of distribution. The equipment typically used to stuff a food and non-food products into the tubular web can produce stress on the entire package, particularly at the crimped ends and along the longitudinal seal of the tube. During the crimping operation, a sharp-edged leg of the metal clip may pierce or tear the packaging web. As a result, the contents of the package leaks through the hole in the packaging web due to the residual pressure in the package produced during the stuffing process. Consequentially, the package product must then be discarded by the manufacturer. Known chub packages will typically include a strong factory heat seal to prevent the longitudinal seam from pulling apart during the stuffing operation, or during the handling and transport of the packaged article. Although a strong heat seal provides protection against unwanted seal failure, it also makes it difficult for the end user to open the package.

Chub packages with peelable seals are known in the art, such as those described in U.S. Pat. No. 7,045,183 B2. These packages include tear notches to initiate the peeling process. However, after peeling has been initiated, tear propagation of these packages is in a direction parallel with the longitudinal seam or in the machine direction of the roll stock. Consequently, the section of package which is removed is a relatively narrow strip of material running the length of the seam. As a result, only a small portion of the product is exposed. In order to gain further access to the product, the consumer must use a knife or cutting implement to remove more of the packaging material. Accordingly, there is needed an improved easy-open chub package which provides greater access to a product enclosed therein without requiring use of a knife or cutting implement and still have sufficient heat resistance, toughness and/or penetration resistance to withstand the heat-sealing and crimping operations of the vertical form fill seal process.

SUMMARY OF THE INVENTION

It is an object of the present invention to provide an easy-open package formed from a peelable thermoplastic laminate suitable for use in chub packaging applications. The easy-open package includes, among other things, a longitudinal seam and a removable strip integrally formed from the peelable thermoplastic laminate which can be removed from the package in a direction substantially perpendicular to the longitudinal seam. The direction perpendicular to the longitudinal seam is defined as the transverse direction of the peelable thermoplastic laminate. Because the removable strips of the present invention have a width defined by substantially parallel side edges which extend perpendicular from the longitudinal seam and a length defined by at least a portion of the circumference of the package, they provide greater access to a product enclosed therein compared to conventional peelable chub packages.

The easy-open package may be produced by folding a peelable thermoplastic laminate onto itself and connecting a first side edge of the laminate to an opposing second side edge thereby defining a tubular member. A longitudinal seam is provided in the package which includes a heat sealed portion having a predetermined seal strength which is advantageously set to a range from 60 and 2,500 grams-force/in. The longitudinal seam further includes a non-heat sealed portion adjacent to and parallel with the heat sealed portion. A plurality of tear notches are provided along an exterior edge of the non-heat sealed portion as a means to initiate the peeling process of the laminate. By manually peeling the non-heat sealed portion between two tear notches, the removable strip may be formed from a portion of the tubular member. Without the use of the peelable thermoplastic laminates according to the present invention, the removable strip cannot be formed with substantially parallel side edges that extend perpendicular from the longitudinal seam. It will be understood that the easy-open packages according to the present invention may include any package size and shape made by the vertical form fill seal (VFFS) process, such as, by not limited to, non-cylindrical shaped packages, for example, square and rectangular shaped pouches.

The various features which characterize the invention are pointed out with particularity in the claims annexed hereto and forming a part of this disclosure. For a better understanding of the invention, reference is made to the accompanying drawings and descriptive matter in which preferred embodiments of the invention are illustrated.

DEFINITIONS

"Polymer" herein refers to the product of a polymerization reaction, and is inclusive of homopolymers, copolymers, terpolymers, tetrapolymers, etc.

"Copolymer" herein refers to a polymer formed by the polymerization reaction of at least two different monomers and is inclusive of random copolymers, block copolymers, graft copolymers, etc.

"Thermoplastic" herein refers to a polymeric material that softens when exposed to heat and which substantially returns to a non-softened condition when cooled to room temperature.

"Substrate" herein refers to any film or sheet comprising at least one polymeric layer of material.

"Seal Strength" values are obtained for five identical samples of a web. The web samples are cut 1 inch (2.54 cm) wide and a suitable length for the test equipment, e.g., about 5 inches (77 cm) long with a 0.25-1 inch (0.635-2.54 cm) wide seal portion centrally and transversely disposed. Opposing end portions of a web sample are secured in opposing clamps in a universal tensile testing instrument. The sample is secured in a taut snug fit between the clamps without stretching prior to beginning the test. The test is conducted at room temperatures (RT) (about 23° C.). The instrument is activated to pull the sample via the clamps transverse to the seal at a uniform rate of 12.0 inches (30.48 cm) per minute until delamination or rupture of the sample. The test temperature noted and lbs. force at break per inch are measured and recorded. The test is repeated for four additional samples and the average grams per inch at delamination are reported.

"Peelable" and like terminology is used herein to refer to any substrate interface or substrate layer which is engineered to be readily peelable (or delaminate within a particular film layer or between two film layers) without uncontrolled or random tearing or rupturing the packaging materials which may result in premature destruction of the packaging film and package made therefrom. A peelable interface or layer is one that can be manually peeled apart to open a package without resort to a knife or other implement to tear or rupture the web. In the present invention, peelable film layers and interfaces must have a seal strength sufficient to prevent failure of the seal during the normal stuffing process and further normal handling and transport of the packaged article. The seal strength must also be low enough to permit manual opening of the seal. Preferably, parameters such as choice of materials and lamination conditions will be used to adjust the seal strength to the desired level for the particular package web and packaging application. A peelable layer and layer interface according to the present invention have an initial seal strength set to a maximum value of 2,500 grams-force/inch and a peelable seal strength set to a range from 60 to 2,500 gram-force/inch. In contrast, a "non-peelable layer interface" is not adapted to peel apart or delaminate in a controlled manner as described above. Non-peelable interfaces have initial seal strengths of at least 2,000 gram-force/inch, typically at least 2,500 gram-force/inch.

"Slow Rate Penetration Resistance" herein refers to the test which permits flexible thermoplastic webs to be characterized for slow rate penetration resistance to a driven probe. The test is performed at room temperature, by applying a biaxial stress at a single test velocity on the material until perforation occurs. The force, energy, and elongation to perforation are determined and reported in units of Newtons. A person having ordinary skill in the art would recognize that Slow Rate Penetration Resistance is a measure of a film's toughness and puncture resistance. A packaging web with a high Slow Rate Penetration Resistance value, relative to an incumbent film, is tougher and more puncture resistant and thus, would be desirable to the packaging industry.

"Heat Shrinkage" values are obtained by measuring unrestrained shrink of a 10 cm by 10 cm square sample immersed in water at 102° C. (or the indicated temperature if different) for five to ten seconds. Four test specimens are cut from a given sample of the film to be tested. Each specimen is completely immersed for 5-10 seconds in a 102° C. (or the indicated temperature if different) water bath. The specimen is then removed from the bath and the distance between the ends of the shrunken specimen is measured for both the M.D. and T.D. directions. The difference in the measured distance for the shrunken specimen and each original 10 cm. side is multiplied by ten to obtain percent shrinkage in each direction. The shrinkage of four specimens is averaged and the average M.D. and T.D. shrinkage values reported. It should be noted that heat shrinkable films referred to herein may be uniaxially or biaxially oriented films. Preferred heat shrinkable films suitable for the present invention have a Heat Shrinkage value of greater than 10% in both machine and transverse directions as measured at 102° C. for 10 minutes. In contrast, preferred non-heat shrinkable films suitable for the present invention have a Heat Shrinkage value of between 0 and 10% in both machine and transverse directions as measured at 102° C. for 10 minutes.

"Oriented" herein refers to a thermoplastic substrate or film obtained by either extrusion of one polymer layer, and coextrusion or extrusion coating of polymeric resins of different layers, to obtain a primary film which is quickly cooled to a solid state to quench (stop or slow) crystallization of the polymers, thereby providing a solid film. The solid primary film is then reheated to the so-called orientation temperature, and thereafter biaxially stretched at the orientation temperature using either a tubular solid-state orientation process (for example a trapped bubble method) or using a flat solid-state orientation process (for example a simultaneous or sequential tenter frame), and finally rapidly cooled below the orientation temperature to provide a heat shrinkable film. In the trapped bubble solid state orientation process, the primary film is stretched in the transverse direction (TD) by passing over an air bubble which is held between two rotating nip rolls, as well as stretched in the longitudinal direction or machine direction (MD) by the differential speed between the two sets of nip rolls that contain the bubble. In the tenter frame process, the primary film is stretched in the longitudinal direction or machine direction (MD) by accelerating the film forward, while simultaneously or sequentially accelerating the film in the transverse direction by guiding the heat softened sheet through a diverging geometry frame. This tenter process typically refers to a flat sheet of relatively thick film. Oriented films may exhibit high shrinkage when reheated to their orientation temperature. Oriented films may exhibit low or no shrinkage when reheated to their orientation temperature, if the film has been annealed following the orientation process. Non-annealed oriented films may be distinguished from non-oriented films by determining the relative amount of heat shrinkage present in the films.

"Non-oriented" herein refers to a thermoplastic substrate or film that has not been oriented and typically exhibit low heat shrinkage values, i.e., between 0 and 10% in both machine and transverse directions as measured at 102° C. for 10 minutes.

"Heat sealing" herein refers to fusing two surfaces together with heating (e.g., by means of a heated bar, hot air, infrared radiation, ultrasonic sealing, etc.).

"Adhesive" herein refers to a layer or material placed on one or more layers to promote the adhesion of that layer to another surface.

"Polyolefin" herein refers to homopolymers, copolymers, including, e.g., bipolymers, terpolymers, etc., having a methylene linkage between monomer units which may be formed by any method known to those skilled in the art. Examples of polyolefins broadly includes polymers such as polyethylene and ethylene copolymers having a small amount of a copolymer such as vinyl acetate, ethylene-alpha olefin copolymers (LLDPE), polypropylene, polybutene, and other polymeric resins falling in the "olefin" family classification. polyethylene (PE), low density polyethylene (LDPE), linear low-density polyethylene (LLDPE), very low-density polyethylene (VLDPE), ultra low-density polyethylene (ULDPE), medium-density polyethylene (MDPE), high-density polyethylene (HDPE), ultra high-density polyethylene (ULDPE), ethylene/propylene copolymers, polypropylene (PP), propylene/ethylene copolymer, polyisoprene, polybutylene, polybutene, poly-3-methylbutene-1, poly-4-methylpentene-1, ionomers, polyethylenes comprising ethylene/a-olefin which are copolymers of ethylene with one or more a-olefins (alpha-olefins) such as butene-1, hexene-1, octene-1, or the like as a comonomer, and the like.

The phrase "ethylene/alpha-olefin" (E/AO) refers to a copolymer produced by the copolymerization of ethylene and any one or more a-olefin. The alpha-olefin in the present invention may have between 3-20 pendant carbon atoms. The co-polymerization of ethylene and an alpha-olefin may be produced by heterogeneous catalysis, i.e., co-polymerization reactions with Ziegler-Natta catalysis systems, for example, metal halides activated by an organometallic catalyst, i.e., titanium chloride, optionally containing magnesium chloride, complexed to trialkyl aluminum and may be found in patents such as U.S. Pat. No. 4,302,565 to Goeke et al. and U.S. Pat. No. 4,302,566 to Karol, et al., both of which are hereby incorporated, by reference thereto, in their entireties. Heterogeneous catalyzed copolymers of ethylene and alpha-olefin may include linear low-density polyethylene, very low-density polyethylene and ultra low-density polyethylene. Copolymers of this type are available from, for example, The Dow Chemical Company, of Midland, Mich., U.S.A. and sold under the trademark DOWLEX® resins. Additionally, the co-polymerization of ethylene and alpha-olefin may also be produced by homogeneous catalysis, for example, co-polymerization reactions with metallocene catalysis systems which include constrained geometry catalysts, i.e., monocyclopentadienyl transition metal complexes taught in U.S. Pat. No. 5,026,798 to Canich, the teachings of which are incorporated herein by reference. Homogeneous catalyzed ethylene/alpha-olefin copolymers (E/AO) may include modified or unmodified ethylene/alpha-olefin copolymers having a long-chain branched (8-20 pendant carbons atoms) alpha-olefin comonomer available from The Dow Chemical Company, known as AFFINITY® and ATTANE® resins, TAFMER® linear copolymers obtainable from the Mitsui Petrochemical Corporation of Tokyo, Japan, and modified or unmodified ethylene/alpha-olefin copolymers having a short-chain branched (3-6 pendant carbons atoms) alpha-olefin comonomer known as EXACT® resins obtainable from ExxonMobil Chemical Company of Houston, Tex., U.S.A.

"Ionomer" as used herein refers to metal-salt, e.g., sodium or zinc, neutralized ethylene acrylic or methacrylic acid copolymers. Commercially available ionomers are sold under the trademark SURLYN® from E.I. de Pont de Nemours and Company, Wilmington, Del., U.S.A.

The term "modified" as used herein refers to a chemical derivative, e.g., one having any form of anhydride functionality, such as anhydride of maleic acid, crotonic acid, citraconic acid, itaconic acid, fumaric acid, etc., whether grafted onto a polymer, co-polymerized with a polymer, or blended with one or more polymers, and is also inclusive of derivatives of such functionalities, such as acids, esters, and metal salts derived therefrom.

"Comminuted" herein refers to a food or nonfood substance that is reduced in size by methods including chopping, flaking, grinding or mincing. A comminuted food substance includes fish or meat products that are reduced in size and restructured or reformulated such as gefilte fish, gyros, ground beef and sausage; and a mixture of two or more types of meat that have been reduced in size and combined, such as sausages made from two or more meats.

BRIEF DESCRIPTION OF THE DRAWINGS

A detailed description of embodiments of the invention follows, with reference to the attached drawings, wherein.

DETAILED DESCRIPTION OF THE INVENTION

Figure 1:
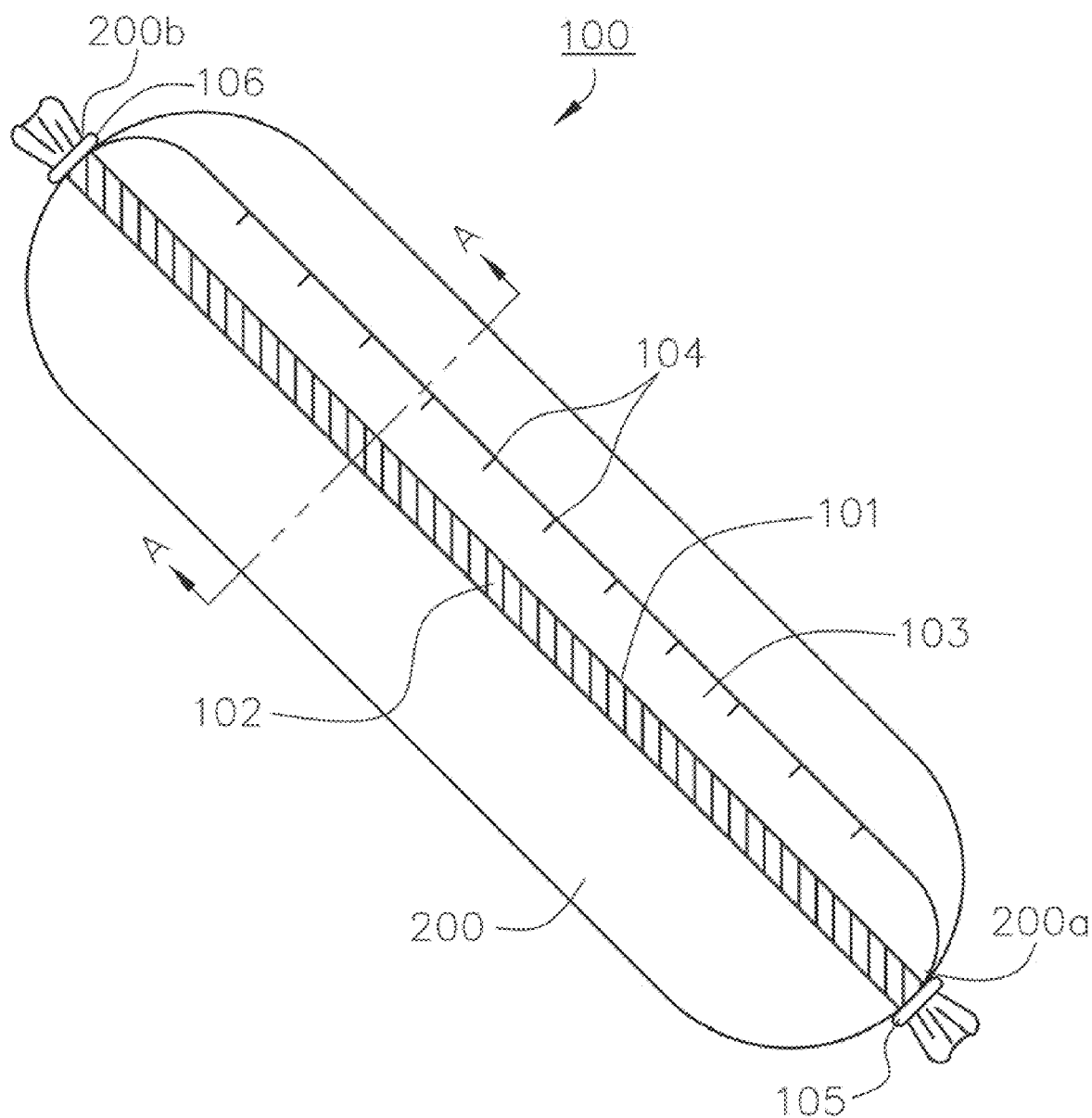
FIG. 1 illustrates an easy-open package formed from a peelable thermoplastic laminate into a closed tubular member according to the present invention having a longitudinal seam.
Figure 4:
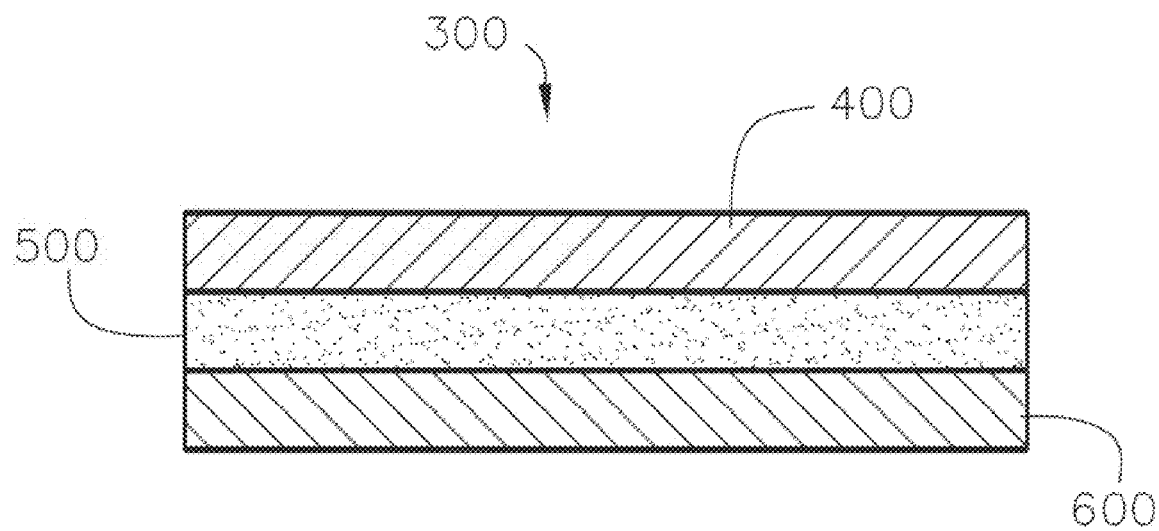
FIG. 4 illustrates a fragmentary cross-sectional view of a peelable thermoplastic substrate suitable for use in the present invention having an oriented or non-oriented first substrate and an oriented or non-oriented second substrate being joined together by an adhesive layer.

FIG. 1 illustrates one embodiment of an easy-open package 100 in accordance with the present invention formed from a peelable thermoplastic laminate 300 (as shown in FIG. 4).

Package 100 includes a longitudinal seam 101 provided by joining a first side edge (see, for example, 300a in FIG. 5) to a second side edge (see, for example, 300b in FIG. 5) of laminate 300 which defines a tubular member 200. Tubular member 200 includes a first end 200a, an opposing second end 200b, an inner surface (not shown) and an outer surface (not shown). Tubular member 200 is depicted in the closed state having a first top seal 105 formed by crimping first tubular end 200a and a bottom seal 106 formed by crimping first tubular end 200b. It will be understood that top seal 105 and bottom seal 106 may also be formed as heat seals across the width of non-cylindrical shaped packages of the present invention.

Longitudinal seam 101 has a heat sealed portion 102 adapted to include a peelable seal strength of between 60 to 2,500 gram-force/inch. It is understood by those skilled in the art that a laminate interface or film layer having a seal strength of less than 60 gram-force/inch will not provide sufficient bonding force to maintain adhesion between two laminate or film surfaces and seal strengths of 2,500 grams-force/inch and higher can not be manually delaminated. FIG. 1 also illustrates heat sealed portion 102 in an overlapping seal condition where the inner surface of tubular member 200 is heat sealed to the outer surface of tubular member 200. It is also contemplated that in other embodiments of the invention, heat sealed portion 102 may be formed in a fin seal condition by heat sealing the inner surface of tubular member 200 to itself. Longitudinal seam 101 further includes a non-heat sealed portion 103 which is adjacent to and parallel with heat sealed portion 102. Non-heat sealed portion 103 provides the consumer a means to grasp the package to facilitate the opening of package 100. In this particular embodiment of the invention, non-heat sealed portion 103 has a length which extends the entire length of tubular member 200 and a width which is proportional to that of heat sealed portion 102. In other embodiments, non-heat sealed portion 103 may have a length less than the entire length of tubular member 200 and a width which is not proportional to that of heat sealed portion 102. Also included with non-heat sealed portion 103 is a plurality of tear notches 104 which provide a means for initiating the peeling of peelable thermoplastic laminate 10 and tearing of heat sealed portion 102. It should be recognized that tear notches 104 may be provided as V-shaped notches, I-shaped notches, or any other flaw in tubular member 200 which would facilitate the peeling of peelable thermoplastic laminate 300 (FIG. 4).

Figure 2:
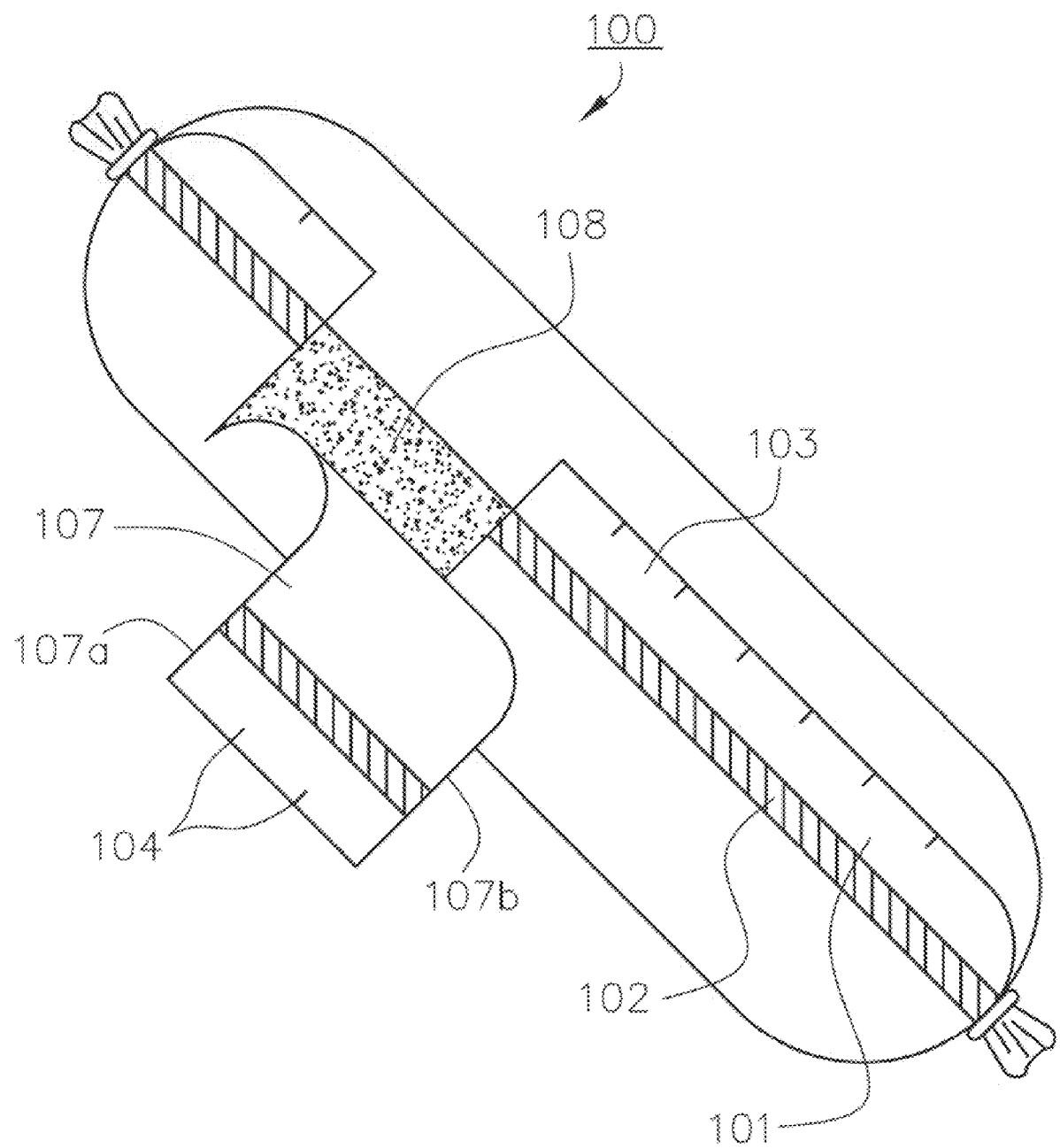
FIG. 2 illustrates an easy-open package in a partially opened condition according to the present invention depicting a removable strip formed by tearing the package in a direction perpendicular to the longitudinal seam.
Figure 3:
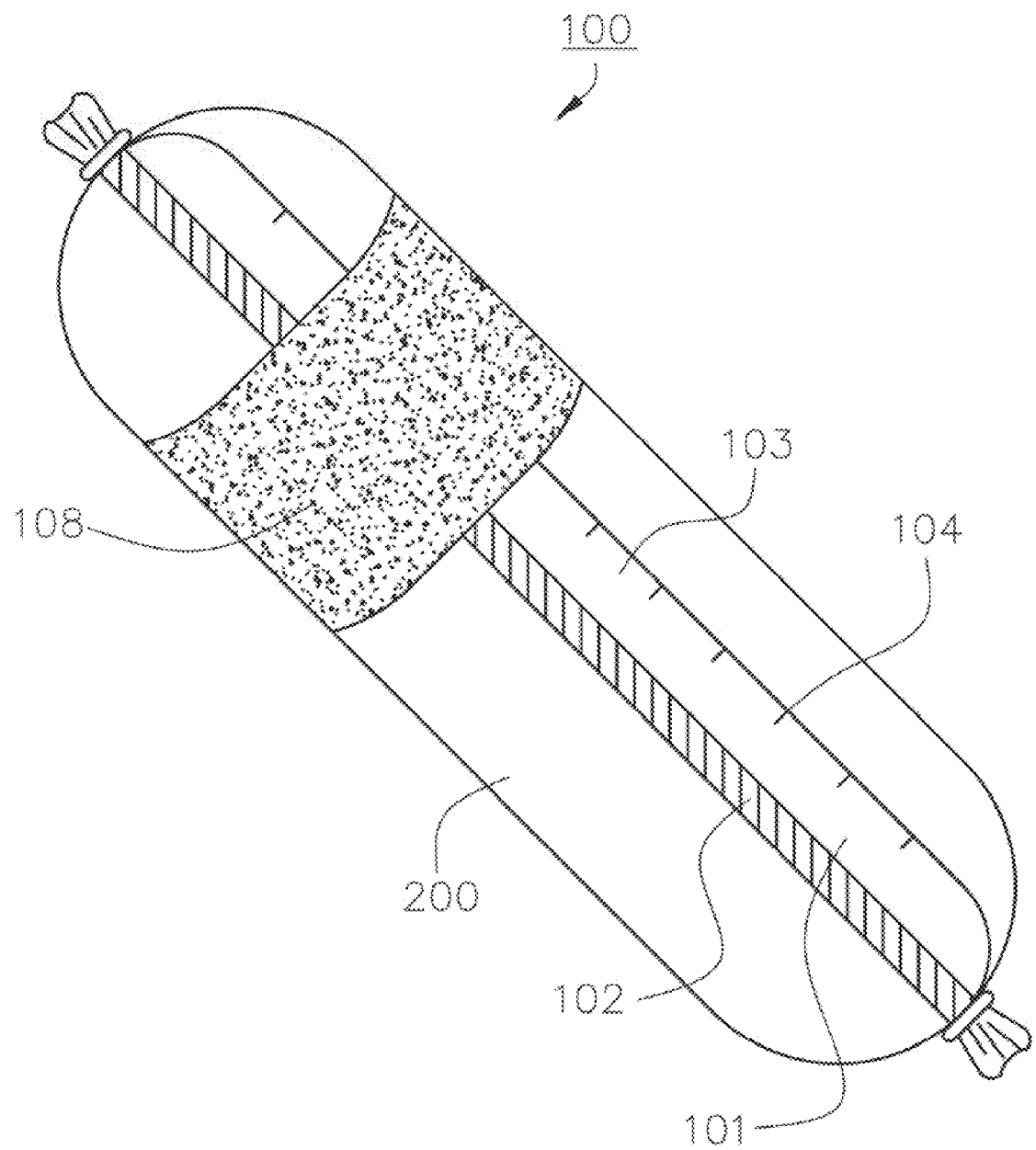
FIG. 3 illustrates an easy-open package in a fully opened condition according to the present invention depicting the removable strip illustrated in FIG. 2 completely removed from the package thereby exposing a product encased therein.

Turning now to FIG. 2, package 100 is shown having a removable strip 107 formed by tearing the non-heated seal portion 103 between two tear notches 104 to thereby expose a product 108. It has been discovered that easy-open package 100 may be adapted by use of peelable thermoplastic laminate 300 (as shown in FIG. 4) to form a removable strip 107 having a width defined by substantially parallel side edges which extend perpendicular to longitudinal seam 101 and a length defined by at least a portion of the circumference of easy-open package 100. It should be understood that the length of the removable strip 107 may also be defined by at least a portion of the front or rear panel of a pouch should a square or rectangular shaped package be formed. FIG. 3 depicts easy-open package 100 in an opened condition according to the present invention depicting the removable strip 107 as illustrated in FIG. 2 completely removed from the package thereby fully exposing a larger section of product 108 encased therein.

FIG. 4 illustrates a fragmentary cross-sectional view of a general structure of peelable thermoplastic substrate 300. Peelable thermoplastic laminate 300 includes a first substrate 400, a second substrate 600 and an adhesive layer 500 disposed between and joining first and second substrates. In a preferred embodiment illustrated in FIG. 7, peelable thermoplastic laminate 300 includes first substrate 400 having a first layer 401 and a second substrate 600 having a first layer 601 and an adhesive layer 500 disposed between and joining the first layer 401 to the first layer 601. In this embodiment, peelable thermoplastic laminate 300 includes a monolayer or multilayer oriented first substrate 400 and a Heat Shrinkage greater than 10% at 102° C., an adhesive layer 500 of solvent-based polyurethane and a multilayer non-oriented second substrate 600 and a Heat Shrinkage between 0 and 10% at 102° C. Preferably, the first layers 401 and 601, are both formed from polyethylene. In this one preferred embodiment, peelable thermoplastic laminate 300 includes a peelable system adapted to separate at an interface between first layer 401 and adhesive layer 500 by a force of between 60 and 2,500 gram-force/inch. Preferably, first layers 401 and 601 have a surface energy of at least 36 dynes/cm².

Figure 8:
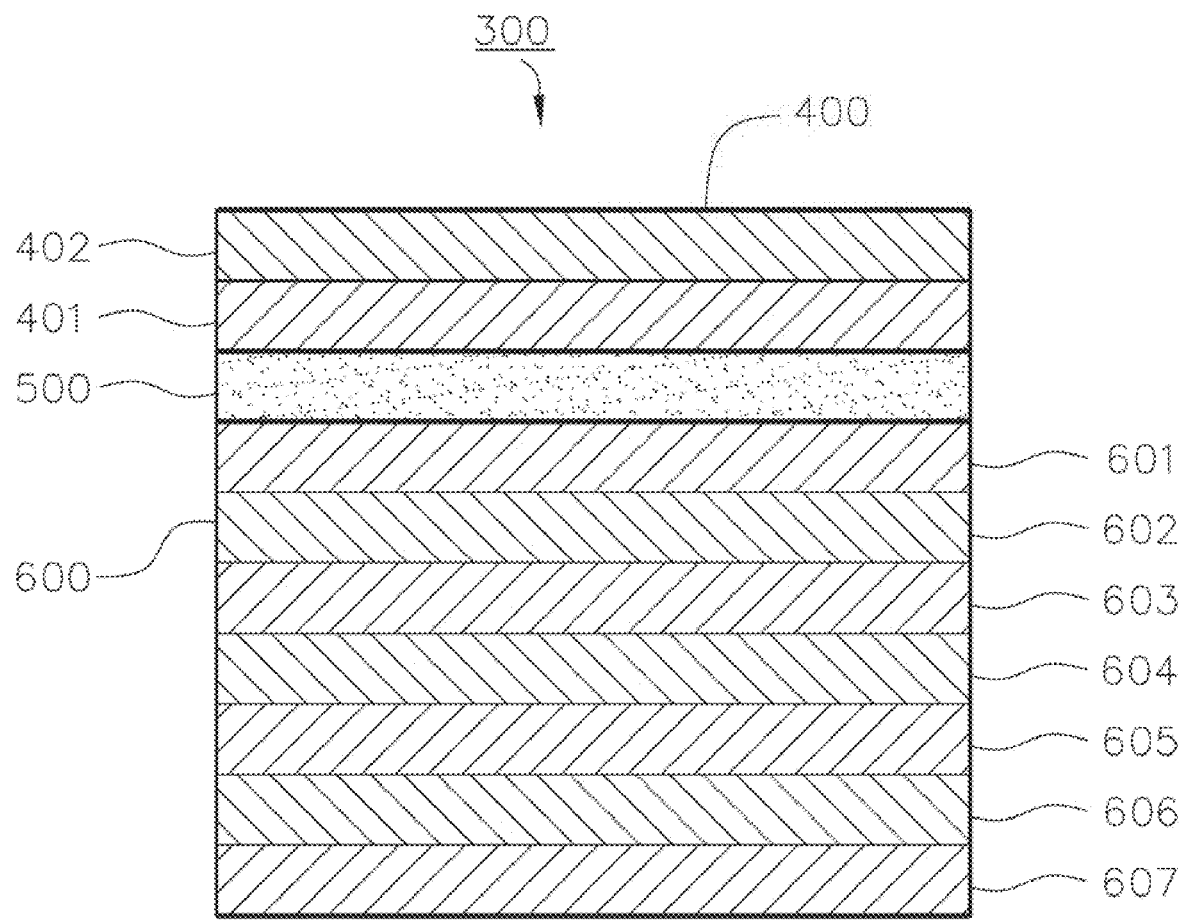
FIG. 8 illustrates a fragmentary cross-sectional view of another preferred embodiment of a peelable thermoplastic substrate depicting a 2-layer first substrate joined to a 7-layer second substrate via the adhesive layer.

In another preferred embodiment illustrated in FIG. 8, peelable thermoplastic laminate 300 includes a multilayer non-oriented first substrate 400 having a first layer 401 and a second layer 402, a multilayer non-oriented second substrate 600 having a first layer 601. Preferably, second layer 402 may be a peelable layer. More preferably, second layer 402 includes a blend of ethylene/vinyl acetate copolymer and polybutene. In this embodiment, adhesive layer 500 is a solvent-based polyurethane or polyethylene and both non-oriented first and second substrates, 400 and 600, have a Heat Shrinkage between 0 and 10% at 102° C. Preferably, first layers, 401 and 601 comprise polyethylene (PE). In this embodiment, peelable thermoplastic laminate 300 includes a peelable system adapted to separate within a peelable second layer, 402 of first substrate 400 by a force of between 60 and 2,500 gram-force/inch. Preferably, first layers 401 and 601 have a surface energy of at least 36 dynes/cm². Multilayer non-oriented second substrate 600 may further include a second layer of polyamide (not shown), a third layer of ethylene/vinyl acetate (not shown) and a fourth layer of polyamide (not shown).

Figure 9:
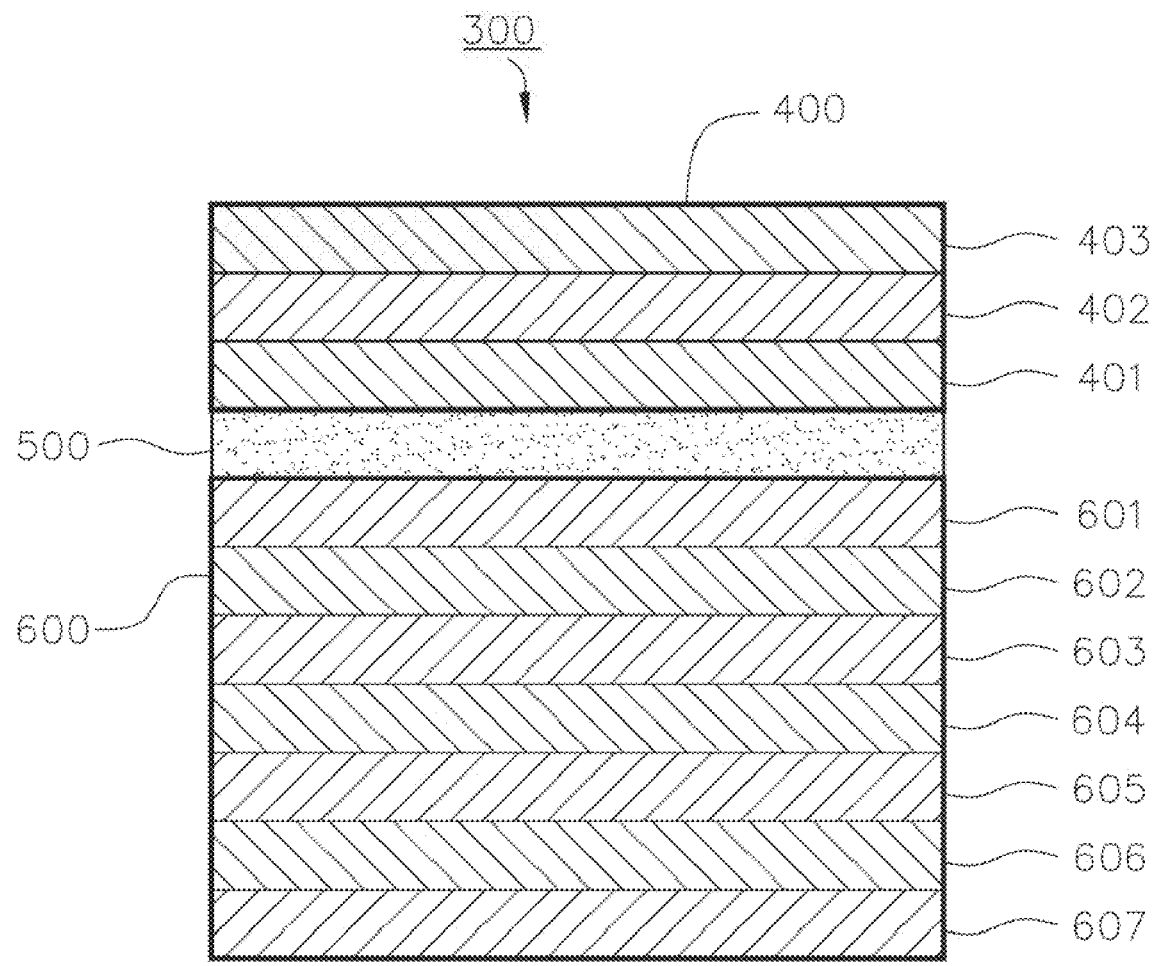
FIG. 9 illustrates a fragmentary cross-sectional view of still another preferred embodiment of a peelable thermoplastic substrate suitable for use in the present invention depicting a 3-layer first substrate joined to a 7-layer second substrate via the adhesive layer.

In yet still another preferred embodiment illustrate in FIG. 9, peelable thermoplastic laminate 300 includes a multilayer non-oriented first substrate 400 having a first layer 401, a second layer 402 and a third layer 403 whereby first layer 401 is at least 20% by basis weight of laminate 300, a multilayer non-oriented second substrate 600 having a first layer 601. Preferably, first layer 401 may be at least 25% or 30% by basis weight of laminate 300. Preferably, second layer 402 is a peelable internal layer. An internal layer should be understood to mean a layer having both surfaces bonded to another layer. More preferably, second layer 402 includes a blend of ethylene/vinyl acetate copolymer and polybutene. In this embodiment, adhesive layer 500 is a solvent-based polyurethane or polyethylene and both non-oriented first and second substrates, 400 and 600, have a Heat Shrinkage between 0 and 10% at 102° C. Preferably, first layers, 401 and 601 comprise polyethylene (PE). In this embodiment, peelable thermoplastic laminate 300 includes a peelable system adapted to separate within a peelable second layer, 402 of first substrate 400 by a force of between 60 and 2,500 gram-force/inch. Preferably, first layers 401 and 601 have a surface energy of at least 36 dynes/cm². Multilayer non-oriented second substrate 600 may further include a second layer of polyamide (not shown), a third layer of ethylene/vinyl acetate (not shown) and a fourth layer of polyamide (not shown).

Figure 5:
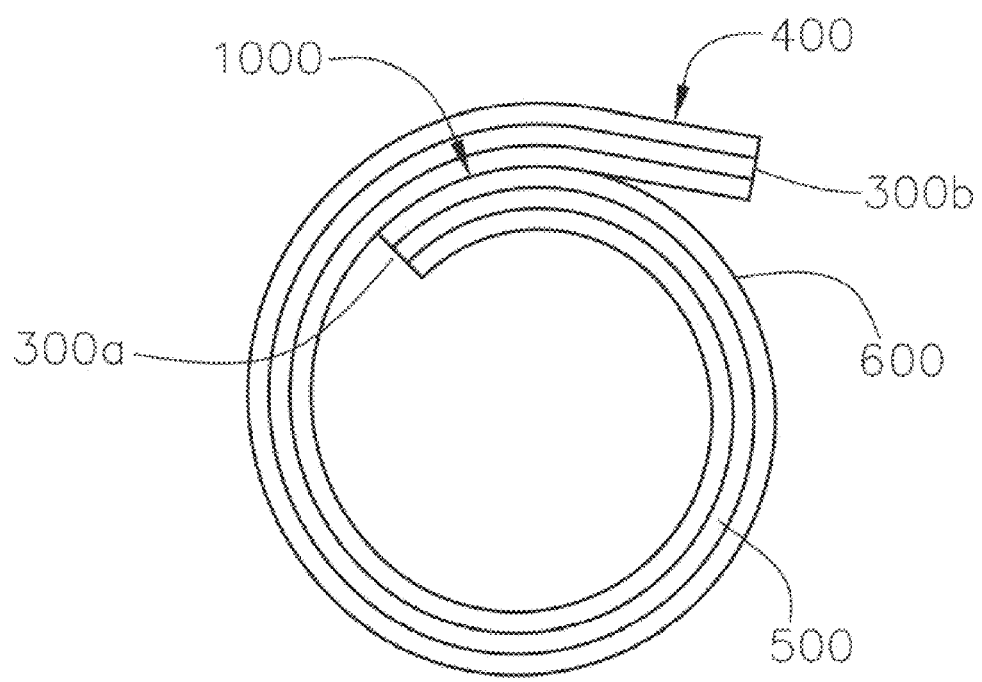
FIG. 5 illustrates a fragmentary cross-sectional view of the peelable thermoplastic substrate of FIG. 4 taken along lines A-A of FIG. 1 depicting a first side end and a second side end of the laminate in an over lapping sealed state.
Figure 6:
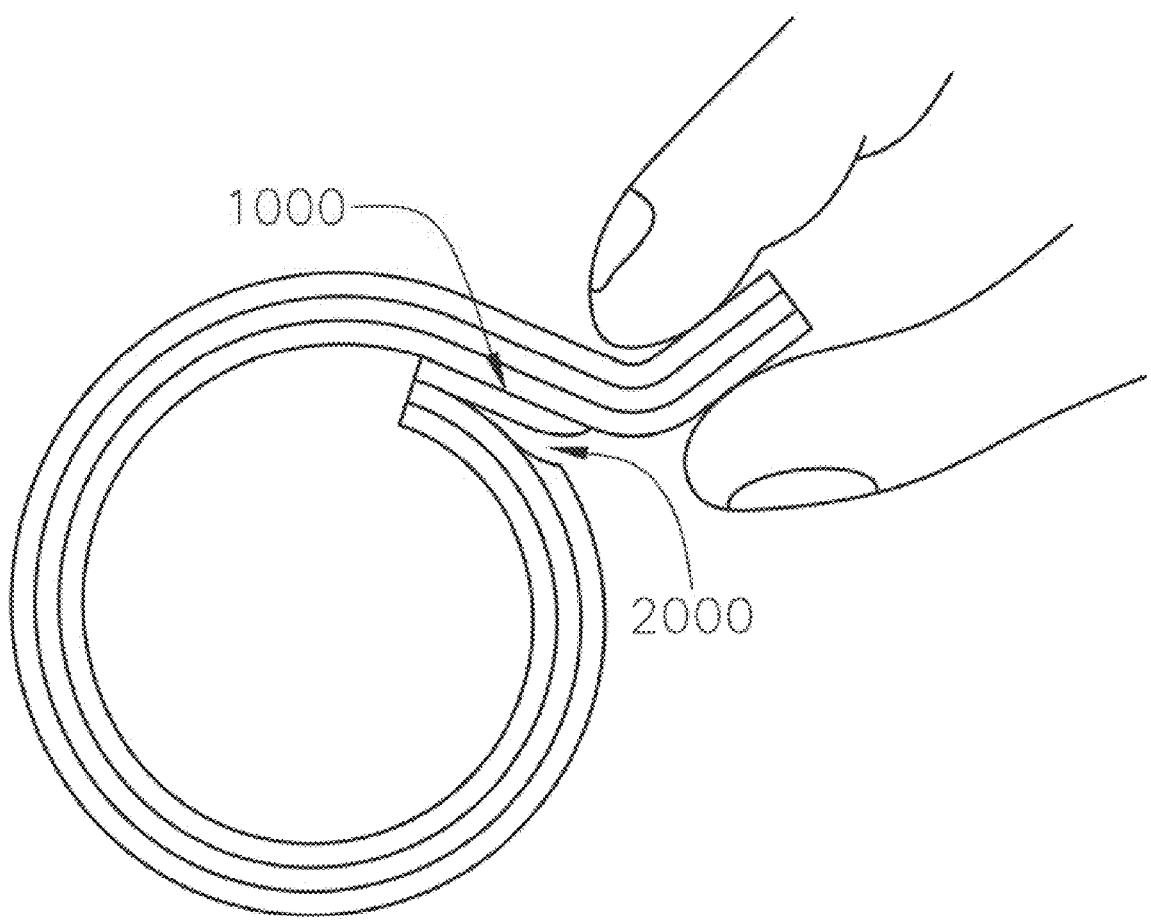
FIG. 6 illustrates a fragmentary cross-sectional view depicting a peelable thermoplastic substrate illustrated in FIG. 5 being peelably opened by the tearing the non-heat sealed portion with fingers.

FIGS. 5 and 6 show peelable thermoplastic laminate 300 of FIG. 4 being joined to itself to provide tubular member 200

(as shown in FIG. 1). As depicted, a first side edge 300a and an opposing second side edge 300b of peelable thermoplastic laminate 300 are connected along longitudinal seam 101 (as shown in FIG. 1) and an overlap seal 1000 is formed. Overlap seal 1000 is provided by heat sealing substrate 400 to substrate 600. Alternatively, first side edge 300a and opposing second side edge 300b of peelable thermoplastic laminate 400 of FIG. 5 may be connected along longitudinal seam 101 (as shown in FIG. 1) and a fin seal (not shown) may be formed. A fin seal is formed by heat sealing, substrate 400 to itself or substrate 600 to itself. FIGS. 5 and 6 further illustrate the overlaid condition of non-heat sealed portion 103 (as shown in FIG. 1) which extends from overlap seal 1000 to the second side edge 300b of peelable thermoplastic laminate 300. It should be evident from FIGS. 5 and 6 that the non-heat sealed portion 103 (as shown in FIG. 1) may be grasped and used to peel apart the heat sealed portion 102 (also shown in FIG. 1). FIG. 6 further illustrates the peeling mechanism (or system) of one embodiment of the present invention. it can be clearly seen from this drawing that immediately following an initial disruption of the overlap seal 1000, a peelable interface 2000 is formed between the first substrate 400 (FIG. 5) and adhesive layer 500 (FIG. 5). Peelable interface 2000 peelably fractures and allows package 100 (as shown in FIG. 1) to open in a controlled manner such that there is tear propagation in a direction perpendicular to the longitudinal seam 101 (as shown in FIG. 1). Although not shown in this drawing, other embodiments of the present invention include a peeling mechanism (or system) comprising one or more peelable layers, preferably, one or more peelable internal layers, within either first substrate 400 or second substrate 600. An example of a peelable internal layer is second layer 402 of first substrate 400 as illustrated in FIG. 9. A peelable internal layer also peelably fractures and allows package 100 (as shown in FIG. 1) to tear open in a controlled manner such that there is tear propagation in a direction perpendicular to the longitudinal seam 101 (as shown in FIG. 1).

Figure 7:
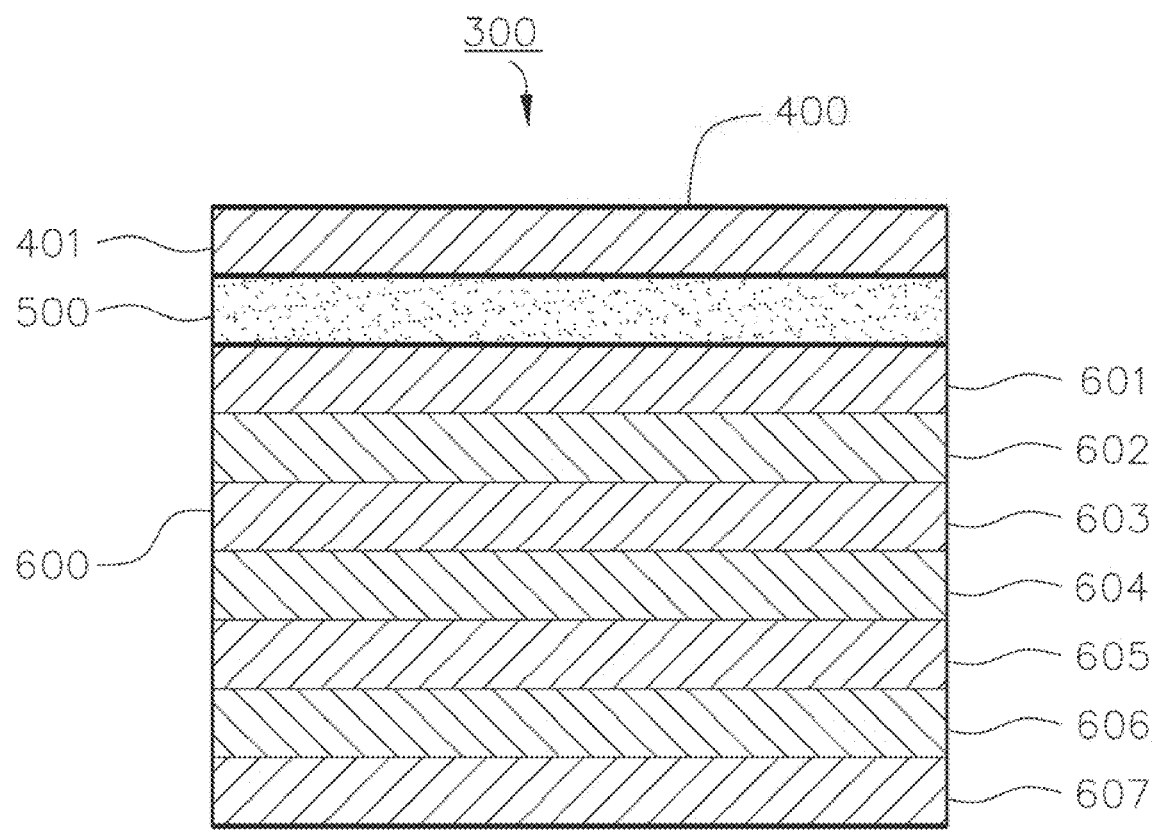
FIG. 7 illustrates a fragmentary cross-sectional view of one preferred embodiment of a peelable thermoplastic substrate depicting a monolayer oriented first substrate joined to a 7-layer non-oriented second substrate via the adhesive layer.

FIG. 7 illustrates a fragmentary cross-sectional view of a preferred embodiment of a peelable thermoplastic substrate illustrated in FIG. 4 depicting a monolayer oriented first substrate joined to a 7-layer non-oriented second substrate via the adhesive layer.

Examples of monolayer oriented first thermoplastic substrates 400 suitable for use in peelable thermoplastic laminate 300 are presented below in Table 1. Examples of suitable multilayer oriented first substrate for use in the present invention are known in the art and have been described in U.S. Pat. Nos. 4,532,189; 4,551,380; 4,755,419; 4,839,235; 4,865,920; 5,004,647; and 5,298,302, which are incorporated by reference herein in their entireties.

TABLE 1

Compositions of Oriented Monolayer First Substrates*

| Ex. | Composition (% wt)** | | | | | | | % Shrinkage*** (MD/TD) |
|---|---|---|---|---|---|---|---|---|
| #1 | 100% PP | | | | | | | 10/10 |
| #2 | 25% LDPE | 75% LLDPE | | | | | | 25-35/25-35 |
| #3 | 65% VLDPE | 25% LLDPE | 10% EMAA | | | | | 25-35/25-35 |
| #4 | 25% LDPE | 10% LMDPE | 65% LLDPE | | | | | 25/25 |
| #5 | 48% VLDPE | 6% Ionomer | 45% Plastomer | | | | | 65/65 |
| #6 | 74% VLDPE | 16% EVA-1 | 10% LLDPE | | | | | 35-45/35-45 |
| #7 | 82% ULDPE | 8% EVA-1 | 10% HDPE | | | | | 20-30/20-30 |
| #8 | 18% LDPE | 55% VLDPE | 8% EVA-1 | 19% LLDPE | | | | 30-40/30-40 |
| #9 | 18% LDPE | 8% EVA-1 | 19% LLDPE | 55% VLDPE | | | | 30-40/30-40 |
| #10 | 12% LDPE | 55% VLDPE | 8% EVA-1 | 25% mPE | | | | 30-40/30-40 |
| #11 | 18% LDPE | 53% VLDPE | 19% LLDPE | 10% Plastomer | | | | 30-40/30-40 |

*All substrates were corona-treated to a surface energy of between 36 and 41 dynes/cm$^2$.
**All film compositions include between 500 and 3000 ppm slip additive and between 1000 and 3000 ppm antiblock additives. Examples #2 and #3 further include between 300 and 600 ppm processing aids.
***Substrates were biaxially oriented and heat shrinkage values were determined at 102° C. for 10 minutes.

Each of the monolayer oriented substrate was corona-treated to a surface energy of between 38 and 50 dynes/cm$^2$ and biaxially stretched by the well-known trapped bubble or double bubble technique as for example described in U.S. Pat. Nos. 3,456,044 and 6,511,688 whose descriptions and teachings are hereby incorporated by reference in their entireties. In this technique an extruded primary tube leaving the tubular extrusion die is cooled, collapsed and then preferably oriented by reheating, re-inflating to form a secondary bubble and re-cooling. The oriented film is preferably biaxially oriented or stretched wherein transverse direction (TD) orientation is accomplished by inflation to radially expand the heated film. The stretch ratios in the biaxial orientation to form the first substrate are preferably sufficient to provide a film with total thickness of between about 0.5 and 5 mil and preferably about 0.75 mil.

Examples of multilayer non-oriented first thermoplastic substrates 400 are presented below in Table 2.

TABLE 2

Composition of a Non-Oriented Multilayer First Substrate (wt.)

| | Example 1 | Example 2 |
|---|---|---|
| First layer* | 61.0% LDPE<br>15.0% LLDPE<br>24.00% TiO$_2$ (70%) in LDPE | 76.0% LLDPE<br>26.5% TiO$_2$ (70%) in LDPE |
| Second layer | 72.0% EVA-2<br>28.0% PB | 63.0% LLDPE<br>25.0% mLLDPE-2<br>12.0% Slip and Antiblock Additives in PE |
| Third layer | 84.00% EVA-2<br>9.20% LLDPE<br>3.70% Slip Additive (5%) in PE<br>3.10% Antiblock Additive (20%) in PE | |
| Total Thickness | 1.25 mil | 1.0 mil |

*First layer of Example 1 of Table 2 had a basis weight of 13.78 lbs/ream and the substrate had a total basis weight of 17.4 lbs/ream.

Adhesive layer 500 of peelable thermoplastic 300 may comprise any suitable composition that provides a desired level of peelable adhesion with the one or more surfaces in contact with the adhesive layer material. Adhesives have been generally described in Kirk-Othmer-Adhesives; pages. 445-466; Vol. 1; 1991, by Aldophus Pocius, the disclosure of which is incorporated herein. Preferably, the adhesive is any packaging adhesive which may include fluid adhesives, solvent based adhesives, and solvent-free adhesives. As used herein, the phrase "fluid adhesive" refers to any substance, inorganic or organic, natural or synthetic, that tends to flow under pressure and/or heat at a rate sufficient to coat a layer in a commercial process. Suitable fluid adhesives may have a wide range of viscosities at room temperature and may have a variety of forms, which include, but are not limited to, for example, solutions, dispersions, emulsions, pastes, mastics, and the like. Suitable organic adhesives may include natural adhesives, i.e., for example, hide and bone glue, fish glue, rubber latex, terpene resins, and mucilages, and synthetic adhesives, which include, but are not limited to polyvinyl acetate emulsions, ethylene/vinyl acetate copolymers, polyurethanes, silicone polymers, cyanoacrylates, epoxy, isocyanates and the like. Fluid adhesives may further include hot-melt adhesives, for example, pressure-sensitive adhesives. Pressure-sensitive adhesives may include, but are not limited to, tackified rubber adhesives, such as natural rubber, olefins, silicones, polyisoprene, polybutadiene, polyurethanes, styrene-isoprene-styrene and styrene-butadiene-styrene block copolymers, and other elastomers; and tackified or untackified acrylic adhesives such as copolymers of isooctylacrylate and acrylic acid, which can be polymerized by radiation, solution, suspension, or emulsion techniques. As used herein, the phrase "solvent-based adhesive" refers to an adhesive system which comprises an adhesive and at least one solvent and requires that the solvent be removed by evaporation (drying) after the solvent-based adhesive is applied to at least one film substrate, layer and the like. A solvent-based adhesive may include a solvent such as conventional petrochemical-based solvents, i.e., for example, but not limited to, alcohols, toluene, esters, and the like, a water-based solvent, and combinations thereof. As used herein, the phrase "solvent-free adhesive" refers to an adhesive system which comprises an adhesive and may include a solvent, but does not require that the solvent be removed by evaporation after the solvent-free adhesive is applied to a film substrate, layer and the like. A solvent-free adhesive may also comprise a solvent-free adhesive which is diluted with a conventional petrochemical-based or water-based solvent prior to coating in order to facilitate its application. Solvent-free adhesives may further comprise radiation curable adhesives which polymerize and/or cross-link when exposed to ultraviolet light or ionizing radiation sources. Preferably adhesive layer 500 is a solvent-based adhesive, more preferably, a solvent based polyurethane adhesive, and most preferably, a solvent based polyether polyurethane adhesive. Examples of a suitable adhesive for use in the present invention include Avadyne® AV5210/CA500-83 and Lamal™ HSN Lamal™ C. The Avadyne® AV5210/CA500-83 system is identified as two-component ethanol-based adhesive having an amine-terminated polyurethane pre-polymer and a epoxy-terminated ether co-reactant, and may be purchased from Henkel KGaA, Dusseldorf, Germany. The Lamal™ HSN Lamal™ C is also a two-component ethanol-based adhesive system having a polyether urethane ingredient admixed with a co-reactant, Lamal C. Lamal™ HSA with the co-reactant supplied by the Rohm and Haas Company, Philadelphia, Pa., U.S.A.

Alternatively, the adhesive layer 500 of peelable thermoplastic 300 may comprise any composition which adheres to a substrate of polyethylene to another substrate of polyethylene. Suitable adhesives include, but are not limited to polyolefins, preferably, polyethylene, such as, for example, low density polyethylene, linear low density polyethylene, very low density polyethylene, ethylene-methacrylic acid copolymer, a linear medium density polyethylene, ethylene/methacrylic acid copolymer, ethylene/alpha olefin copolymer, high density polyethylene and metallocene-catalysis ethylene/hexene copolymer.

Examples of seven-layer multilayer non-oriented second substrate 600 are presented below in Table 3.

TABLE 3

Compositions of Non-Oriented Multilayer Second Substrates (wt.)

| Layer | Example #1 | Example #2 | Example #3 |
|---|---|---|---|
| First* | 41.0% LLDPE<br>30.0% mLLDPE-1<br>26.5% $TiO_2$ (70%) in LDPE<br>2.5% Slip Additive (5%) in PE | 56.0% LDPE<br>15.0% LLDPE<br>26.5% $TiO_2$ (70%) in LDPE<br>2.5% Slip Additive (5%) in PE | 65.0% LLDPE<br>30.0% mLLDPE-1<br>2.5% Slip Additive (5%) in PE<br>2.5% Antiblock Additive (20%) in PE |
| Second | 66.0% VLDPE<br>18.0% $TiO_2$ (70%) in LDPE<br>16.0% mod-PE | 66.0% LDPE<br>18.0% $TiO_2$ (70%) in LDPE<br>16.0% mod-PE | 90.0% VLDPE<br>10.0% mod-PE |
| Third | 100% Polyamide | 100% Polyamide | 100% Polyamide |
| Fourth | 100% EVOH | 100% EVOH | 100% EVOH |
| Fifth | 100% Polyamide | 100% Polyamide | 100% Polyamide |
| Sixth | 66.0% ULDPE<br>18.0% $TiO_2$ (70%) in LDPE<br>16.0% mod-PE | 66.0% LDPE<br>18.0% $TiO_2$ (70%) in LDPE<br>16.0% mod-PE | 90.0% VLDPE<br>10.0% mod-PE |
| Seventh | 55.5% LLDPE<br>35.0% EVA-1<br>5.0% $TiO_2$ (70%) in LDPE<br>4.5% Slip Additive (5%) in PE | 55.5% LLDPE<br>35.0% EVA-1<br>5.0% $TiO_2$ (70%) in LDPE<br>4.5% Slip Additive (5%) in PE | 84.0% EVA-2<br>9.2% LLDPE<br>3.7% Slip Additive (5%) in PE<br>3.1% Antiblock Additive (20%) in PE |
| Total Thickness | 1.26 mil | 1.26 mil | 1.25 mil |

| Layer | Example #4 | Example #5 |
|---|---|---|
| First* | 92.2% VLDPE<br>6.0% Antiblock<br>1.2% Slip Additive (5%) in PE<br>0.6% LLDPE Processing Additive (3%) in PE | 80.00% LDPE<br>15.00% LLDPE<br>2.5% Slip Additive (5%) in PE<br>2.5% Antiblock Additive (20%) in PE |
| Second | 90.0% VLDPE<br>10.0% mod-PE | 90.00% LDPE<br>10.0% mod-PE |
| Third | 100% Polyamide | 100% Polyamide |
| Fourth | 100% EVOH | 100% EVOH |
| Fifth | 100% Polyamide | 100% EVOH |
| Sixth | 80.0% EVA-3<br>20.0% mod-PE | 90.00% LDPE<br>100% mod-PE |
| Seventh | 78.1% EVA-3<br>15.5% Antiblock (20%) in EVA-3<br>6.4% Slip Additive (5%) in EVA-3 | 84.0% EVA-2<br>9.2% LLDPE<br>3.7% Slip Additive (5%) in PE<br>3.1% Antiblock Additive (20%) in PE |
| Total Thickness | 1.75 mil | 1.26 mil |

*Layer 1 was corona-treated to a surface energy of between 38 and 50 dynes/$cm^2$. Layer 1 of Example 5 had a total basis weight of 18.4 lbs/ream.

Non-oriented second substrate 600 may be produced using simple blown film processes which are described, for example, in The Encyclopedia of Chemical Technology, Kirk-Othmer, Third Edition, John Wiley & Sons, New York, 1981, Vol. 16, pp. 416-417 and Vol. 18, pages. 191-192, the disclosures of which are incorporated herein by reference. Generally, the simple blown film process may include an apparatus having a multi-manifold circular die head through which the film layers are forced and formed into a cylindrical multilayer film bubble. The bubble may be quenched, e.g., via cooled water bath, solid surface and/or air, and then ultimately collapsed and formed into a multilayer film. It is appreciated by a person of ordinary skill in the art that cast extrusion techniques may also be used to fabricate the non-heat shrinkable thermoplastic substrates for use in the present invention. Typically, these substrates may have a total basis weight of between 18.1 and 18.8 lbs/ream.

"PB" is a random copolymer of butene-1 (polybutene-1) with a low ethylene content resin having a melt index of 1 g/10 min., density of 0.906 g/cm$^3$ and a melting point of 97° C. (corresponds with the melting point of crystalline form which is measured immediately after solidification). An example of a suitable commercially available polybutene-1 resin includes PB 8640M supplied by Basell Service Company, B.V., Rotterdam, The Netherlands.

"PP" is a polypropylene resin having a melt index of 5 g/10 min., density of 0.9 g/cm$^3$ and a melting point of 142° C. An example of a suitable commercially available polypropylene resin includes Dow™ 6D65L from the Dow Chemical Company, Midland, Mich., U.S.A.

"LDPE" is a low density polyethylene resin having a melt index of 2 g/10 min. and density of 0.923 g/cm$^3$. Examples of suitable commercially available low density polyethylene resin include Dow™ 503A LDPE from the Dow Chemical Company, Midland, Mich., U.S.A., and ExxonMobil™ LDPE LD100 from ExxonMobil Chemical Company, Houston, Tex., U.S.A.

"LLDPE" is a linear low density polyethylene resin having a melt index of 0.9-1.0 g/10 min., density of 0.92 g/cm$^3$. Examples of suitable commercially available linear low density polyethylene resins include Dow™ 2645G, 2045G and Dow™ Elite® 5100G from the Dow Chemical Company, Midland, Mich., U.S.A, and Sclair® FP120 A from the Nova Chemicals, Inc. Calgary, Alberta, Canada.

"VLDPE" is a very low density polyethylene resin having a melt index of 0.5-1.0 gi 10 min., density of 0.910-0.912 g/cm$^3$. An example of a suitable commercially available very low density polyethylene resin includes Dow™ 4201G from the Dow Chemical Company, Midland, Mich., U.S.A.

"EMAA" is an ethylene-methacrylic acid copolymer resin having a melt index of 2.5 g/10 min. and a melting point of 84° C. An example of a suitable commercially available ethylene-methacrylic acid copolymer resin includes DuPont™ Nucrel® 903HC from E. I. du Pont de Nemours and Company, Wellington, Del., U.S.A.

"LMDPE" is a linear medium density polyethylene resin having a melt index of 1 g/10 min. and density of 0.93 g/cm$^3$. An example of a suitable commercially available linear medium density polyethylene resin includes Dow™ 2038.68G from the Dow Chemical Company, Midland, Mich., U.S.A.

"Ionomer" is a zinc salt of an ethylene/methacrylic acid copolymer resin having a melt index of 5.5 g/10 min. and density of 0.952 g/cm$^3$. An example of a suitable commercially available ionomer resin includes DuPont™ Surlyn® 1705-1 from E. I. du Pont de Nemours and Company, Wellington, Del., U.S.A.

"Plastomer" is an ethylene/alpha olefin copolymer resin having a melt index of 1 g/10 min. and density of 0.895 g/cm$^3$. An example of a suitable commercially available plastomer includes ExxonMobil Exact® 9523 from ExxonMobil Chemical Company, Houston, Tex., U.S.A.

"EVA-1" is an ethylene/vinyl acetate copolymer resin having a vinyl acetate content of 12% (wt.), a melt index of 0.35 g/10 min., and density of 0.93 g/cm$^3$. An example of a suitable commercially available ethylene/vinyl acetate copolymer resin having a vinyl acetate content of 12% (wt.) includes DuPont™ Elvax® 3135XZ from E. I. du Pont de Nemours and Company, Wellington, Del., U.S.A.

"EVA-2" is an ethylene/vinyl acetate copolymer resin having a vinyl acetate content of 12% (wt.), a melt index of 0.35 g/10 min., and density of 0.93 g/cm$^3$. An example of a suitable commercially available ethylene/vinyl acetate copolymer resin having a vinyl acetate content of 12% (wt.) includes DuPont™ Elvax® 3135XZ from E. I. du Pont de Nemours and Company, Wellington, Del., U.S.A.

"HDPE" is a high density polyethylene resin having a melt index of 0.4 g/10 min. and density of 0.949 g/cm$^3$. An example of a suitable commercially available plastomer includes Equistar™ Alathon® L5040 from Lyondell Chemical Company, Houston, Tex., U.S.A.

"mPE" is a metallocene-catalysis ethylene/hexene copolymer resin having a melt index of 1 g/10 min. and density of 0.92 g/cm$^3$. An example of a suitable commercially available mPE includes Enable® 20-10 CB from ExxonMobil Chemical Company, Houston, Tex., U.S.A.

"mod-PE" is an anhydride-modified polyethylene copolymer resin having a melt index of 2.7-4:0 g/10 min. and density of 0.910-0.939 g/cm$^3$. An example of a suitable commercially available anhydride-modified polyethylene copolymer resin includes Equistar™ PX 3308 from Equistar Chemicals, LLP, Houston, Tex., U.S.A.

"Polyamide" is a nylon 6/nylon 66 copolymer resin having a density of 1.12 g/cm$^3$ and a melting point (DSC) of 196.1° C. An example of a suitable commercially available nylon 6/nylon 66 copolymer resin includes Ultramid® C33-01 from BASF Polyamides and Intermediates, Freeport, Tex., U.S.A.

"EVOH" is an ethylene/vinyl alcohol copolymer resin having an ethylene content of 38%. (mol), a melt index of 3.2 g/10 min. and density of 1.17 g/cm$^3$. An example of a suitable commercially available ethylene/vinyl alcohol copolymer resin having an ethylene content of 38% (mol.) includes Soarnol® ET 3803 from Soarus, LLP, Arlington Heights, Ill., U.S.A.

"mLLDPE-1" is a metallocene-catalysis ethylene/hexene copolymer resin having a melt index of 1 g/10 min and density of 0.918 g/cm$^3$. Examples of a suitable commercially available mLLDPE include Exceed® 1018C and 1018CA both from ExxonMobil Chemical Company, Houston, Tex., U.S.A.

"mLLDPE-2" is a metallocene-catalysis ethylene/hexene copolymer resin having a melt index of 7.5 g/10 min and a density of 0.99 g/cm$^3$.

"EVA-2" is an ethylene/vinyl acetate copolymer resin having a vinyl acetate content of 5% (wt.), a melt index of 2.0 g/10 min. and density of 0.924 g/cm$^3$. An example of a suitable commercially available ethylene/vinyl acetate copolymer resin having a vinyl acetate content of 5% (wt.) includes ExxonMobil LD306 from ExxonMobil Chemical Company, Houston, Tex., U.S.A.

"EVA-3" is an ethylene/vinyl acetate copolymer resin having a vinyl acetate content of 18% (wt.), a melt index of 30.0 g/10 min. and density of 0.94 g/cm$^3$. An example of a suitable commercially available ethylene/vinyl acetate copolymer resin having a vinyl acetate content of 18% (wt.) includes DuPont™ Elvax® 3176CW-3 from E. I. du Pont de Nemours and Company, Wellington, Del., U.S.A.

Unless otherwise noted, the polymer resins utilized in the present invention are generally commercially available in pellet form and, as generally recognized in the art, may be melt blended or mechanically mixed by well-known methods using commercially available equipment including tumblers, mixers or blenders. Also, if desired, well-known additives such as processing aids, slip agents, anti-blocking agents and pigments, and mixtures thereof may be incorporated into the polymer layers, by blending prior to extrusion. The resins and any additives may be introduced to an extruder where the resins are melt-plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

Preferably, first layers, 401 and 601 of the first and second substrates, 400 and 600, respectively, are surface-treated to provide a desired surface energy prior to lamination with adhesive layer. "Surface treatment" herein refers to any technique which alters the surface energy (or surface tension) of a film layer and may include techniques such as, but is not limited to, corona, flame, and plasma treatment, ozone, ultra-high frequency electrical discharge, UV or laser bombardment, chemical priming, and the like. The phrase "corona treatment" refers to, in general, the process wherein an electrical discharge generated by a high-voltage electric field passes through a polymer substrate. It is believed that the electrical discharge or "corona" may ionize the oxygen molecules surrounding the substrate which chemically interact with the surface atoms of the substrate thereby changing the surface energy of the polymer substrate. Preferably, the first surface of the first and second substrates are corona treated such that each surface has a surface energy of at least 30 dynes/cm, preferably, at least 34 dynes/cm, and more preferably, between 36-50 dynes/cm. As used herein, the phrases "surface tension" and "surface energy" are used interchangeably herein and refer to the affinity between molecules at the surface of a polymer film layer for one another. It is appreciated by a person of ordinary skill in the art that surface tension is a measure of surface energy of a polymer film substrate which involves determination of the interaction between the solid film substrate and a test liquid or "dyne liquid." Surface tension is expressed in units of force per unit of width, e.g., dynes per centimeter. Measuring surface energy of a polymer film substrate may also be known as a "dyne test." Typically, a dyne test involves applying a dyne liquid, e.g., a predetermined mixture of ethylene glycol monoethyl ether and formamide having a known surface tension, across one square inch of a polymer surface. If the continuous film of liquid remains intact or fails to wet-out for two or more seconds, the next higher surface tension liquid is applied. If the liquid dissipates in less than two seconds, the next lower surface tension solutions are tried until an exact measurement is attained.

To produce the final peelable thermoplastic laminates, extrusion lamination, co-extrusion lamination, adhesion lamination, or the like are employed to adhere the first substrate 400 to the second substrate 600. Particularly, adhesive lamination is preferred in that there is a remarkable improvement in the seal strength of the peelable interface compared with other conventional methods. With adhesive lamination, the solid-state substrates are bonded together by an adhesive which is applied to one or both substrates during this process. Depending on the type of adhesive used, a further step of drying or curing of the adhesive may be required after its application. With an adhesive positioned between and in contact with both the first and second substrates, the substrates are pressed together between the two heated steel rollers to form the final laminate. The steps of contacting and pressing the substrates together may be accomplished sequentially or simultaneously. The temperature of the steel rollers or nip can vary depending upon the adhesive material used and the speed at which the films travel through the rollers. Particularly with a solvent-based adhesive, more particularly with a solvent-based polyurethane adhesive, and most particularly with a solvent-based polyether polyurethane adhesive, it is preferred that the nip temperature is controlled between a temperature of between about 100° F. and 160° F., more for some oriented substrate embodiments, between 105° F. and 145° F., and most preferably, at about 120° F., and for non-oriented substrate embodiments, 145° F. and 185° F., and most preferably, at about 160° F. The final packaging film is then wound around a roller for storage and/or further processing. It is further contemplated that higher nip temperatures may be needed than those described above when polyolefins such as, for example, polypropylene is used as one or both first surface layers in the present invention.

EXAMPLE 1

In a preferred embodiment of a peelable thermoplastic laminate, a monolayer oriented first substrate having the composition of Example #8 of Table 1 was joined to a multilayer non-oriented second substrate having the composition of Example #1 of Table 3 via adhesive layer of solvent-based polyurethane. The resulting laminate had a structure identical to that illustrated in FIG. 7. This laminate had a total thickness of about 2.0 mil, a oxygen transmission rate of 0.5 $cm^3/100\ in^2/24$ hr @ 23° C. and 80% relative humidity and a moisture vapor transmission rate of less than 1.0 $g/H_2O/100\ in^2/24$ hr @ 38° C. and 90% relative humidity. An overlapping heat-seal was provided to form an easy-open package (as shown in FIG. 1). The initial seal strength was about 1,320 gram-force/inch and the peelable seal strength was about 200 grams-force/in. This laminate exhibited a Heat Shrinkage value of between 0 and 10% at 102° C. in either the machine or transverse directions.

EXAMPLE 2

In another preferred embodiment of a peelable thermoplastic laminate, a multilayer non-oriented first substrate having the composition of the Example #1 of Table 2 was joined to a multilayer non-oriented second substrate having the composition of Example #5 of Table 3 via adhesive layer of solvent-based polyurethane. The resulting laminate had a structure identical to that illustrated in FIG. 9. This laminate had a total thickness of about 2.5 mil, a oxygen transmission rate of less than 1.0 $cm^3/100\ in^2/24$ hr @ 23° C. and 80% relative humidity and a total basis weight of 37.16 lbs/ream. Since layer one of Example #1 of Table 2 had a weight basis of 13.78 lbs/ream relative to the first substrate and the total basis weight of this laminate was 37.16 lbs/ream, the first layer of the first substrate was at least 25% by weight basis of the final laminate. An overlapping heat-seal was provided to form an easy-open package (as shown in FIG. 1). The peelable seal strength was from 230 to 990 grams-force/in. This laminate exhibited a Heat Shrinkage value of between 0 and 10% at 102° C. in either the machine or transverse directions.

COMPARATIVE EXAMPLE

In an example of a non-peelable thermoplastic laminate, a multilayer non-oriented first substrate having the composition of Example 2 of Table 2 was joined to a multilayer non-oriented second substrate having the composition of Example #3 of Table 3 via an adhesive layer of solvent-based polyurethane. The resulting laminate had a structure identical to that depicted in FIG. 8. The final laminate had a total thickness of about 2.25 mil, a oxygen transmission rate of 0.5 cm$^3$/100 in$^2$/24 hr @ 23° C. and 80% relative humidity and a moisture vapor transmission rate of less than 1.0 g/H$_2$O/100 in$^2$/24 hr @ 38° C. and 90% relative humidity. An overlapping heat-seal was provided to form a chub package (as shown in FIG. 1). The initial seal strength of the overlapping heat seal was 2000-3000 grams-force/in. No peelable seal strength was observed. This laminate exhibited a Heat Shrinkage value of between 0 and 10% at 102° C. in either the machine or transverse directions.

As Table 4 compares the physical properties of Example 1 and Comparative Example and includes values for Slow Rate Penetration Resistance (against both the first outer surfaces, i.e., layer 401 of Example 1 and layer 402 of Comparative Example, and second outer surfaces, i.e., layer 607 of both Example 1 and Comparative Example), Tensile Peak Stress, Tensile Yield and Tensile Modulus. It can be seen from Table 4 that the values Slow Rate Penetration Resistance, Tensile Peak Stress, Tensile Yield and Tensile Modulus for Example 1 were higher and thus improved compared with the Comparative Example. Example 1 also exhibited lower Tear Resistance and Tensile Elongation values compared with the Comparative Example. Lower Tear Resistance and Tensile Elongation values are both desirable characteristics in packaging laminates used for chub packaging applications because lower tear resistance improves the ease of tearing or opening of a package and lower tensile elongation increases the dimensional stability of the laminates.

TABLE 4

Average Laminate Properties

|  | Example 1 | Comparative Example |
|---|---|---|
| Slow Rate Penetration Resistance (Outer Surface) in Newtons | 16.90 | 10.57 |
| Slow Rate Penetration Resistance (Inner Surface) in Newtons | 22.02 | 13.19 |
| Tensile Yield (MD) in psi | 2764 | 2166 |
| Tensile Yield (TD) in psi | 2797 | 2159 |
| Tensile Peak Stress (MD) in psi | 7114 | 5169 |
| Tensile Peak Stress (TD) in psi | 6715 | 4151 |
| Tensile Modulus (MD) in psi | 66259 | 58319 |
| Tensile Modulus (TD) in psi | 64742 | 61829 |
| Tear Resistance (MD) in gram-force | 214.40 | 1058.29 |
| Tear Resistance (TD) in gram-force | 169.60 | 476.80 |
| Tensile Elongation (MD) in % | 157 | 389 |
| Tensile Elongation (MD) in % | 156 | 536 |

Unless otherwise noted, the physical properties and performance characteristics reported herein were measured by test procedures similar to the following ASTM methods. The ASTM test procedures are hereby incorporated herein by reference in their entireties.

| Density | D-1505 |
|---|---|
| Heat Shrinkage | D-2732 |
| Melt Index | D-I238 |
| Melting Point | D-3417 |
| Oxygen Transmission Rate | D-3985 |
| Seal Strength | F-88-94 |
| Slow Rate Penetration Resistance | F-1306 |
| Surface Energy | D-2578 |
| Tensile Yield | D-882 |
| Tensile Modulus | D-882 |
| Tensile Elongation | D-882 |
| Tensile Peak Stress | D-882 |
| Tear Resistance (Elmendorf Tear) | D-1922 |

It will be apparent to those skilled in the art that modifications and additions can be made to the various embodiments described above, without departing from the true scope and spirit of the present invention. It should be understood that this invention is not intended to be unduly limited by the illustrative embodiments set forth herein and that such embodiments are presented by way of example only with the scope of the invention intended to be limited only by the claims set forth herein as follows.

What is claimed is:

1. An easy-open package comprising:
   a tubular member formed from a peelable thermoplastic laminate having a first side edge and an opposing second side edge;
   a longitudinal seam connecting said first side edge of said laminate to said opposing second side edge of said laminate and defining a tubular member having a first tubular member end and an opposing second tubular member end, and an inner surface and an outer surface; wherein said longitudinal seam comprises a heat sealed portion having a predetermined seal strength and a non-heat sealed portion adjacent to and parallel with said heat sealed portion; wherein said non-beat sealed portion comprises a plurality of tear notches;
   a top seal formed proximate to said first tubular member end;
   a bottom seal formed proximate to said second tubular member end; and
   a peelable removable strip formed by manually tearing said non-heat sealed portion between two tear notches to peel away from said package and expose a product enclosed therein; wherein said removable strip has a width defined by substantially parallel side edges extending perpendicular to said longitudinal seam and a length defined, by at least a portion of the circumference of said package.

2. The easy-open package according to claim 1, wherein said laminate has a tear resistance of less than 400 gram-force in a direction perpendicular to said longitudinal seam.

3. The easy-open package according to claim 1, wherein said tear resistance of said peelable laminate is less than 200 gram-force in a direction perpendicular to said longitudinal seam.

4. The easy-open package according to one of claim 1, 2 or 3 wherein said direction perpendicular to said longitudinal seam is the transverse direction of said laminate.

5. The easy-open package according to claim 1, wherein said seal strength of said heat sealed portion is between 60 and 2,500 gram-force/in.

6. The easy-open package according to claim 1, wherein said heat sealed portion forms an overlap seal.

7. The easy-open package according to claim 1, wherein said heat sealed portion forms a fin seal.

8. The easy-open package according to claim 1, wherein said top and bottom seals are formed by crimping said inner member surface together.

9. The easy-open package according to claim 1, wherein said product is a comminuted meat product.

10. The easy-open package according to claim 1, wherein said peelable thermoplastic laminate comprises:
an oriented monolayer or multilayer first substrate having a heat shrinkage greater than 10% at 102° C. and comprising a first layer of polyethylene;
a non-oriented multilayer second substrate having heat shrinkage value of between 0 and 10% at 102° C. and comprising a first layer of polyethylene;
an adhesive layer of solvent-based polyurethane joining said first layers of said first substrate to said outer layer of said second substrate; and
wherein said laminate includes a peelable system adapted to separate at the interface between said adhesive layer and said first substrate by a force of between 60 and 2,500 gram-force/in.

11. The easy-open package according to claim 10, wherein said oriented first substrate is biaxially oriented.

12. The easy-open package according to claim 10, wherein said adhesive layer is solvent-based polyether polyurethane adhesive.

13. The easy-open package according to claim 10, wherein said peelable laminate has a Slow Rate Penetration Resistance value greater than 11 Newtons.

14. The easy-open package according to claim 13, wherein said peelable laminate has a Slow Rate Penetration Resistance value greater than 14 Newtons.

15. The easy-open package according to claim 10, wherein said first layers have a surface energy of at least 36 dynes/cm$^2$.

16. The easy-open package according to claim 1, wherein said peelable thermoplastic laminate comprises:
a non-oriented multilayer first substrate having a heat shrinkage of between 0 and 10% at 102° C. and comprising a first layer of polyethylene and a second layer of a blend of ethylene/vinyl acetate copolymer and polybutene; wherein said first layer of said first substrate is an outer layer and is at least 25% by basis weight of said laminate;
a non-oriented multilayer second substrate having heat shrinkage value of between 0 and 10% at 102° C. and comprising a first layer of polyethylene;
an adhesive layer of polyethylene or solvent-based polyurethane joining said first layer of said first substrate to said first layer of said second substrate; and
wherein said laminate includes a peelable system adapted to separate within said second layer of said first substrate by a force of between 60 and 2,500 grams-force/in.

17. The easy-open package according to claim 16, wherein said first layer of said second substrate is at least 30% by basis weight of said laminate.

18. The easy-open package according to claim 10 or 16, wherein said second substrate further includes:
a second layer of polyamide;
a third layer of ethylene/vinyl alcohol; and
a fourth layer of polyamide 19. The easy-open package according to claim 16, wherein said first layers have a surface energy of at least 36 dynes/cm$^2$.

20. The easy-open package according to claim 1, wherein said package is a chub package.

21. An easy-open package comprising:
a tubular member formed from a peelable thermoplastic laminate having a first side edge and an opposing second side edge;
a longitudinal seam connecting said first side edge of said laminate to said opposing second side edge of said laminate and defining a tubular member having a first tubular member end and an opposing second tubular member end, and an inner surface and an outer surface; wherein said longitudinal seam comprises a heat sealed portion having a predetermined seal strength and a non-heat sealed portion adjacent to and parallel with said heat sealed portion; wherein said non-heat sealed portion comprises a plurality of tear notches;
a top seal formed proximate to said first tubular member end;
a bottom seal formed proximate to said second tubular member end;
wherein said laminate comprises an oriented monolayer or multilayer first substrate having a heat shrinkage greater than 10% at 102° C. and comprising an outer layer of polyethylene; a non-oriented monolayer or multilayer second substrate having heat shrinkage value of between 0 and 10% at 102° C. and comprising a first layer of polyethylene; an adhesive layer of solvent-based polyurethane joining said first layer of said first substrate to said first layer of said second substrate; wherein said laminate includes a peelable system adapted to separate at the interface between said adhesive layer and said first layer of said first substrate by a force of between 60 and 2,500 gram-force/in; and
a peelable removable strip formed by manually tearing said non-heat sealed portion between two tear notches to peel away from said package and expose a product enclosed therein; wherein said removable strip has a width defined by substantially parallel side edges extending perpendicular to said longitudinal seam and a length defined by at least a portion of the circumference of said package.

22. The easy-open package according to claim 21, wherein said laminate has a tear resistance of less than 400 gram-force in a direction perpendicular to said longitudinal seam.

23. The easy-open package according to claim 21, wherein said tear resistance of said peelable laminate is less than 200 gram-force in a direction perpendicular to said longitudinal seam.

24. The easy-open package according to one of claim 21, 22 or 23, wherein said direction perpendicular to said longitudinal seam is the transverse direction of said laminate.

25. The easy-open package according to claim 21, wherein said seal strength of said heat sealed portion is between 60 and 2,500 gram-force/in.

26. The easy-open chub package according to claim 21, wherein said heat sealed portion forms an overlap seal.

27. The easy-open package according to claim 21, wherein said heat sealed portion forms a fin seal.

28. The easy-open package according to claim 21, wherein said top and bottom seals are formed by crimping said inner member surface together.

29. The easy-open package according to claim 21, wherein said top and bottom seals are formed by crimping together said inner member surface.

30. The easy-open package according to claim 21, wherein said product is a comminuted meat product.

31. The easy-open package according to claim 21, wherein said oriented first substrate is biaxially oriented.

32. The easy-open package according to claim 21, wherein said adhesive layer is solvent-based polyether polyurethane adhesive.

33. The easy-open package according to claim 21, wherein said peelable laminate has a Slow Rate Penetration Resistance value greater than 11 Newtons.

34. The easy-open package according to claim 33, wherein said peelable laminate has a Slow Rate Penetration Resistance value greater than 14 Newtons.

35. The easy-open package according to claim 21, wherein said first layers have a surface energy of at least 36 dynes/cm$^2$.

36. The easy-open package according to claim 21, wherein said package is a chub package.

37. An easy-open package comprising:
a tubular member formed from a peelable thermoplastic laminate having a first side edge and an opposing second side edge:
a longitudinal seam connecting said first side edge of said laminate to said opposing second side edge of said laminate and defining a tubular member having a first tubular member end and an opposing second tubular member end, and an inner surface and an outer surface; wherein said longitudinal seam comprises a heat sealed portion having a predetermined seal strength and a non-heat sealed portion adjacent to and parallel with said heat sealed portion; wherein said non-heat sealed portion comprises a plurality of tear notches;
a top seal formed proximate to said first tubular member end;
a bottom seal formed proximate to said second tubular member end;
wherein said laminate comprises a non-oriented multilayer first substrate having a heat shrinkage of between 0 and 10% at 102° C. and comprising a first layer of polyethylene and a second layer of a blend of ethylene/vinyl acetate copolymer and polybutene; wherein said first layer of said first substrate is an outer layer and is at least 25% by basis weight of said laminate; a non-oriented multilayer second substrate having heat shrinkage value of between 0 and 10% at 102° C. and comprising a first layer of polyethylene; an adhesive layer of polyethylene or solvent-based polyurethane joining said first layer of said first substrate to said first layer of said second substrate; wherein said laminate includes a peelable system adapted to separate within said second layer of said first substrate by a force of between 60 and 2,500 gram-force/in.; and
a removable strip formed by manually tearing said non-heat sealed portion between two tear notches to peel away from said package and expose a product enclosed therein; wherein said removable strip has a width defined by substantially parallel side edges extending perpendicular to said longitudinal seam and a length defined by at least a portion of the circumference of said package.

38. The easy-open package according to claim 37, wherein said laminate has a tear resistance of less than 400 gram-force in a direction perpendicular to said longitudinal seam.

39. The easy-open package according to claim 37, wherein said tear resistance of said peelable laminate is less than 200 gram-force in a direction perpendicular to said longitudinal seam.

40. The easy-open package according to one of claim 37, 38 or 39, wherein said direction perpendicular to said longitudinal seam is the transverse direction of said laminate.

41. The easy-open package according to claim 37, wherein said seal strength of said heat sealed portion is between 10 and 2,500 grams-force/in.

42. The easy-open chub package according to claim 37, wherein said heat sealed portion forms an overlap seal.

43. The easy-open package according to claim 37, wherein said heat sealed portion forms a fin seal.

44. The easy-open package according to claim 37, wherein said top and bottom seals are formed by crimping said inner member surface together.

45. The easy-open package according to claim 37, wherein said product is a comminuted meat product.

46. The easy-open package according to claim 37, wherein said first layer of said first substrate is at least 30% by basis weight of said laminate.

47. The easy-open package according to claim 21 or 37, wherein said second substrate further includes:
a second layer of polyamide;
a third layer of ethylene/vinyl alcohol; and
a fourth layer of polyamide.

48. The easy-open package according to claim 37, wherein said outer layer have a surface energy of at least 36 dynes/cm$^2$.

49. The easy-open package according to claim 37, wherein said package is a chub package.

* * * * *

UNITED STATES PATENT AND TRADEMARK OFFICE
CERTIFICATE OF CORRECTION

PATENT NO. : 8,147,934 B2  
APPLICATION NO. : 12/614963  
DATED : April 3, 2012  
INVENTOR(S) : Otacilio Teixeira Berbert Page 1 of 1

It is certified that error appears in the above-identified patent and that said Letters Patent is hereby corrected as shown below:

On the Title Page, Item (57), Abstract, line 2, "whereby the manually" should read -- whereby manually --.

In the Specification  
Column 5, line 15, "classification." should read -- classification --.  
Column 6, line 20, "THE." should read -- THE --.  
Column 9, line 32, "sealing," should read -- sealing --.  
Column 9, line 41, "it" should read -- It --.  
Column 9, line 42, "dearly" should read -- clearly --.  
Column 12, line 56, Table 3, "100% mod-PE" should read --10.0% mod-PE --.  
Column 13, line 46, "0.5-1.0 gi 10 min.," should read -- 0.5-1.0 g/10 min., --.  
Column 14, line 31, "4:0" should read -- 4.0 --.

In the Claims  
Column 18, Claim 1, line 49, "defined," should read -- defined --.  
Column 21, Claim 37, line 18, "edge:" should read -- edge; --.  
Column 22, Claim 41, line 23, "10" should read -- 60 --.  
Column 22, Claim 48, line 43, "have" should read -- has --.

Signed and Sealed this  
Twenty-fifth Day of June, 2013

Teresa Stanek Rea  
*Acting Director of the United States Patent and Trademark Office*